US008124205B2

(12) United States Patent
Watanabe

(10) Patent No.: US 8,124,205 B2
(45) Date of Patent: Feb. 28, 2012

(54) DECORATED FERRULE AND GOLF CLUB USING THE SAME

(75) Inventor: Tomoe Watanabe, Tokyo (JP)

(73) Assignee: Bridgestone Sports, Co. Ltd., Tokyo (JP)

( * ) Notice: Subject to any disclaimer, the term of this patent is extended or adjusted under 35 U.S.C. 154(b) by 723 days.

(21) Appl. No.: 11/959,627

(22) Filed: Dec. 19, 2007

(65) Prior Publication Data

US 2008/0152852 A1 Jun. 26, 2008

(30) Foreign Application Priority Data

Dec. 20, 2006 (JP) ................................ 2006-343458

(51) Int. Cl.

| | |
|---|---|
| ***B32B 1/06*** | (2006.01) |
| ***B32B 1/08*** | (2006.01) |
| ***A63B 53/02*** | (2006.01) |
| ***A63B 53/00*** | (2006.01) |

(52) U.S. Cl. ................... 428/36.9; 428/35.7; 428/36.92; 473/310

(58) Field of Classification Search ................. 428/35.7, 428/34.1, 36.9, 36.92; 473/310, 308, 309
See application file for complete search history.

(56) References Cited

U.S. PATENT DOCUMENTS

2002/0142111 A1* 10/2002 Auld et al. ...................... 428/13

FOREIGN PATENT DOCUMENTS

| | | | |
|---|---|---|---|
| JP | 55-21710 | Y2 | 5/1980 |
| JP | 3-219822 | A | 9/1991 |
| JP | 10-286330 | A | 10/1998 |
| JP | 2004-034333 | A | 2/2004 |
| JP | 3103748 | U | 6/2004 |

OTHER PUBLICATIONS

Machine Translation of JP 10-286330 Oct. 1998.*
Japanese Office Action dated Jan. 7, 2009.

* cited by examiner

*Primary Examiner* — Rena Dye
*Assistant Examiner* — Erik Kashinkow
(74) *Attorney, Agent, or Firm* — Sughrue Mion, PLLC

(57) ABSTRACT

A ferrule includes a brilliant three-dimensional decoration member fixed to a surface of the ferrule.

9 Claims, 6 Drawing Sheets

DECORATED FERRULE AND GOLF CLUB USING THE SAME

BACKGROUND OF THE INVENTION

1. Field of the Invention

The present invention relates to a ferrule having a decoration and a golf club using the same, and more particularly to a ferrule including a brilliant three-dimensional decoration member fixed to a surface of the ferrule and a golf club using the same.

2. Description of the Related Art

A ferrule is also called a socket, and is mounted at an end of a hosel which is a shaft connecting portion of golf head of a golf club, and has an effect of relaxing the impact on the shaft at a ball impact.

Such ferrule is principally formed by a resin or a resin coated with a metal, but has scarcely decorated and has lacked a design property or a decoration property.

Therefore, in order to improve the decoration effect, there is proposed a decoration socket, constructed by fixing a decoration ring, which is formed by integrating a metal-colored intermediate layer such as a metal foil between a smaller-diameter tube portion of a synthetic resin and a larger-diameter tube portion of a synthetic resin, in an appropriate cross-sectional position in the axial direction of a socket pipe, as disclosed in JP-UM-B-55-21710.

Also proposed is a socket, formed by tubular members divided in the axial direction, and including a metal decoration ring between the divided tubular members of the socket main body, as disclosed in Japanese Utility Model Registration No. 3103748.

SUMMARY OF THE INVENTION

Thus the prior ferrules are of simple designs merely having some ring-like patterns, and still lack the design property or the decoration property. They do not have glitteringly brilliant appearance nor attract attention of people, thus being poor in the design property and in the decoration effect.

With the recent increase in the female golfers, various fashionable products have been provided in the golf wears and golfing goods, thus providing an enjoyment in fashion, while the golf clubs have pursued functionality only and lack decorativeness giving an enjoyment in use.

Also the prior ferrule, being divided and inserted by the decoration ring, is weak in the strength and is easily broken, and involves a drawback of reducing the aforementioned effect of the ferrule. Also it is formed through a number of steps, thus involving a drawback requiring a complex producing process and an elevated cost.

Therefore, an object of the present invention is to provide a golf club and a ferrule adapted for use therein, having a highly decoration effect, being producible easily and inexpensively, also attracting attention of people by a glitteringly brilliant appearance and giving an enjoyment in use, while solving the drawbacks in the prior art, without losing the strength by providing the decoration and without losing the effect of the ferrule.

In order to accomplish the aforementioned object, according to a first aspect of the invention, there is provided a ferrule including a brilliant three-dimensional decoration member fixed to a surface of the ferrule.

Further, according to a second aspect of the invention according the first aspect of the invention, a concave portion is formed on a part of the surface of the ferrule and the brilliant three-dimensional decoration member is fixed in the concave portion.

Further, according to a third aspect of the invention according the second aspect of the invention, the concave portion is formed over a circumference of the ferrule.

Further, according to a fourth aspect of the invention according the second or third aspect of the invention, the concave portion has a width of from 2 to 5 mm in a shorter side direction and has a depth of from 0.2 to 2 mm.

Further, according to a fifth aspect of the invention according any one of the first to fourth aspect of the invention, the brilliant three-dimensional decoration member has a width of from 0.5 to 3 mm.

Further, according to a sixth aspect of the invention according any one of the first to fifth aspect of the invention, the brilliant three-dimensional decoration member includes at least one of a transparent resinous granular article and a metal granular article.

Further, according to a seventh aspect of the invention according the sixth aspect of the invention, the transparent resinous granular article is faintly colored.

Further, according to a eighth aspect of the invention according the sixth or seventh aspect of the invention, a resin constituting the transparent resinous granular article is an acryl resin.

Further, according to a ninth aspect of the invention, there is provided a golf club including a ferrule according to any one of the first to eighth aspect of the invention.

According to the present invention, as a brilliant three-dimensional decoration member is fixed to the surface of the ferrule, it is rendered possible to provide a decoration easily and inexpensively, without deteriorating the strength and without losing the effect of the ferrule. Also a glitteringly brilliant appearance enables to improve the design property and the decoration property, thereby allowing to provide a golf club attracting attention of people and giving an enjoyment in use.

Also by forming a concave portion on a part of the surface of the ferrule and by fixing the brilliant three-dimensional decoration member in the concave portion, the brilliant three-dimensional decoration member is not easily peeled off and the fixing strength can improved.

Also by forming the concave portion over a circumference of the ferrule, it is rendered possible to provide a satisfactory appearance and to improve the design property.

Also by forming the concave portion with a width of from 2 to 5 mm in a shorter side direction and with a depth of from 0.2 to 2 mm, the brilliant three-dimensional decoration member can be fixed easily and securely.

Also by the brilliant three-dimensional decoration member having a width of from 0.5 to 3 mm, it is rendered possible to improve the design property and the decoration effect without causing a hindrance in the golf play.

Also by forming the brilliant three-dimensional decoration member with a transparent resinous granular article and/or a metal granular article, a glitteringly brilliant appearance is provided to further improve the design property.

Also by faintly coloring the transparent resinous granular article, a more glitteringly brilliant appearance is provided to further improve the design property.

Also by utilizing an acryl resin as a resin constituting the transparent resinous granular article, a more glitteringly brilliant appearance is provided over a prolonged period.

Furthermore, a golf club characterized in being equipped with the ferrule according to any one above can have the effects described above.

BRIEF DESCRIPTION OF THE DRAWINGS

FIGS. 2A and 2B are lateral views showing shapes of a concave portion of the ferrule of the present invention, wherein FIG. 2A shows an L-shaped vertical cross section, and FIG. 2B shows a square U-shaped vertical cross section;

FIGS. 3A to 3D are perspective views showing shapes of the concave portion of the ferrule of the present invention, wherein FIG. 3A shows a concave portion formed over a circumference of the ferrule 1, FIG. 3B shows a concave portion formed in a part of the circumference, FIG. 3C shows a concave portion of a vertically elongated form, and FIG. 3D shows a concave portion in a square or circular shape;

FIGS. 4A to 4C are partial lateral views of an embodiment of the present invention, wherein FIG. 4A shows a structure without a concave portion, FIG. 4B shows a structure in which a decoration member protrudes from the concave portion, and FIG. 4C shows a structure in which the decoration member is completely embedded in the concave portion;

DETAILED DESCRIPTION OF THE EMBODIMENTS

Figure 1:
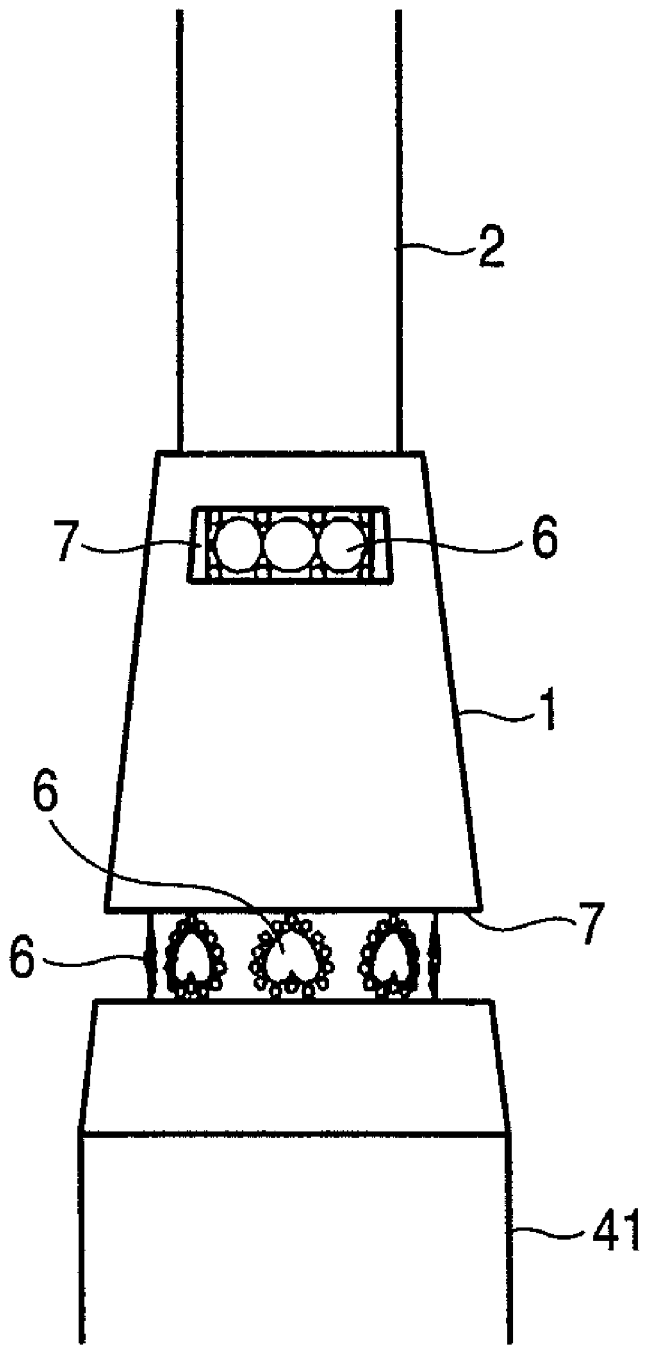
FIG. 1 is a lateral view of an embodiment of the present invention.

Now the present invention will be described in detail, with reference to the accompanying drawings. A golf club 10 has a grip 3 at an upper end of a shaft 2, while a lower end part of the shaft 2 is inserted into a hosel 41 integrally molded with a head 4, and a ferrule 1 is mounted so as to cover an inserted portion of the lower end part of the shaft 2 into the hosel 41. The ferrule 1 is provided with a concave portion 7, in which a brilliant three-dimensional decoration member 6 is fixed across an adhesive layer 9. The brilliant three-dimensional decoration member 6 constitutes a decoration member for decorating the ferrule 1, and may be used singly or in plural units to constitute of a decoration member on an integral pattern, such as a flower pattern or a continuous pattern.

The ferrule 1 is a tubular member, having an inversely tapered shape expanding in diameter toward the lower end (toward the hosel 41) and having therein an insertion hole 19 for the shaft 2 to penetrate through. The insertion hole 19 of the ferrule 1 for passing the shaft 2 has an internal diameter which is preferably smaller toward the lower side (toward the hosel 41) than in the upper side. Inversely, a thickness of the ferrule is thicker in a lower side and thinner in an upper side.

A material of the ferrule 1 is not particularly restricted, but is preferably formed with a celluloid resin. It may naturally be produced with a thermoplastic resin utilizing an injection molding method, but, because of the production utilizing a mold, a releasing agent remains on the surface of the ferrule and has to be sufficiently washed off, thereby complicating the production process and elevating the production cost. On the other hand, in case of producing the ferrule by a celluloid resin, the production is executed by a cutting work which does not leave the releasing agent on the surface of the ferrule and can dispense with a washing step, thus also being preferable for the adhesion of the brilliant three-dimensional decoration member 6.

The brilliant three-dimensional decoration member 6 may be constituted of a resinous granular article having reflectivity and luster, particularly a transparent resinous granular article, a metal granular article, a glass, a gem or a simulated gem. Also usable is a chain-like article by connecting these substances with a resin, a metal-coated resin or a metal.

A resin to be used in the resinous granular article is not particularly restricted so far as it has reflectivity and luster, but a resin having transparency or a resin colored faintly is preferably used as it can provide a glitteringly brilliant appearance thereby further improving the design property and the decoration property. Also an acryl resin, having a high transparency and showing little discoloration, is particularly preferable. Also an ordinary urethane resin is flexible and advantageous, but causes a discoloration over a prolonged period, so that an urethane resin of a type showing little discoloration is preferable for use.

An example of the urethane resin is that of two-liquid type, which is a resin curable at the normal temperature and in which a polyol main component and a polyisocyanate curing agent are to be mixed at the use. The polyol to be used may be acryl polyol, polyester polyol, polyether polyol or polyurethane polyol having a hydroxyl group within the molecule, and the polyisocyanate prepolymer includes various types depending on the raw material isocyanate to be used. Among these, the resins based on aromatic isocyanates are liable to cause a yellow discoloration by an ultraviolet light and are therefore undesirable, but those based on xylylene diisocyanate, isophorone diisocyanate or hexamethylene diisocyanate are less liable to cause yellow discoloration and are therefore preferable.

Also the metal granular article, generally having a specific gravity larger than in resins, may affect the balance of the golf club depending on an amount to be fixed. Therefore, as the metal granular article, a metal of a relatively low specific gravity, such as aluminum or titanium, is preferably used.

Also for a similar reason, an article formed by coating a resinous granular article with a metal film may be used. The metal constituting the coating film is preferably a light metal such as aluminum or titanium. For example an aluminum coating on an urethane type elastomer or a titanium coating on an acryl resin can provide a metallic luster thereby realizing a glittering appearance.

As the simulated gem, a Rhine stone can be used advantageously. The Rhine stone is a simulated gem made of glass, which can be realized in various colors such as blue, red, green or purple, by mixing gold, iron, manganese and the like.

In case of a brilliant three-dimensional decoration member 6 having transparency, a metal is preferably adhered on a rear surface to increase the reflection, thereby further increasing the glittering appearance.

The shape of the brilliant three-dimensional decoration member 6 is not particularly restricted so far as it can be accommodated in the concave portion 7, but a front surface opposite to the adhered surface may be formed as a curved surface such as a part of a spherical surface or may have plural facets as in a diamond cut to provide a beautiful appearance utilizing reflection of light. Also a rear surface of the brilliant three-dimensional decoration member 6, namely a surface opposed to the ferrule, may be formed flat but preferably has a uniformly curved concave surface corresponding to a bottom surface 71 of the concave portion 7. Such structure allows to facilitate the adhesion and to improve the strength of fixation.

Also a width of the brilliant three-dimensional decoration member 6 in vertical and lateral directions is not particularly restricted, and is preferably about from 0.5 to 3 mm in each granular article. Such narrow width is adopted because, in order to fix on the circumference of the cylindrical ferrule 1, in case of a brilliant three-dimensional decoration member 6 having an excessively large width, particularly when it has a flat rear surface, an adhesive portion in the fixing part becomes incapable of adhering but tends to generate a large gap on both lateral ends, thereby being easily peeled off. It is also possible to select the longitudinal and/or lateral width of the brilliant three-dimensional decoration member 6 substantially same as the width of the concave portion 7 in the shorter side direction thereof, and to fit the brilliant three-dimensional decoration member 6 into the concave portion 7, thereby improving the strength of fixing.

The concave portion 7, formed in a part of the surface of the ferrule 1, is provided in order, by fixing the brilliant three-dimensional decoration member 6 in the concave portion 7, that the brilliant three-dimensional decoration member 6 is less peelable and the strength of fixing can be improved. Such construction avoids that the brilliant three-dimensional decoration member 6 is caught and detached for example when the golf club is extracted from a golf bag.

Figure 2B:
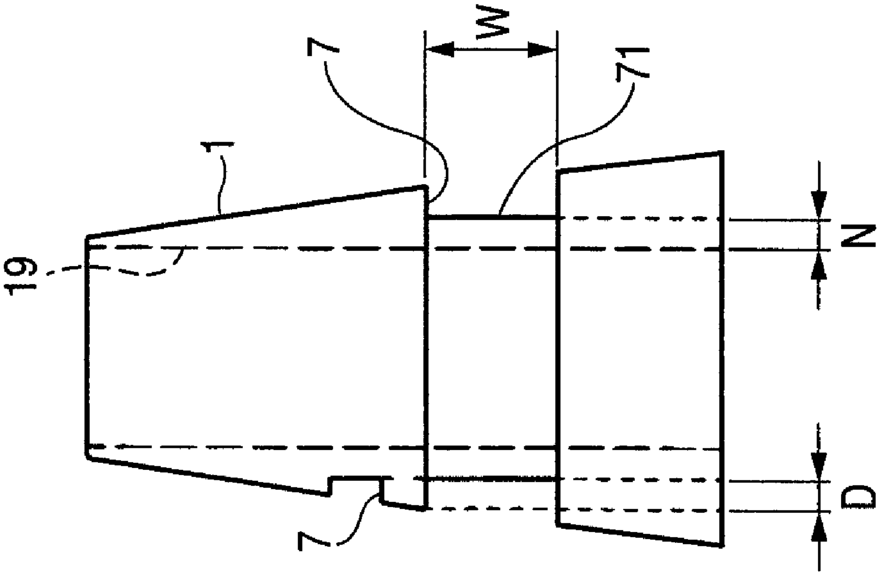
Figure 2A:
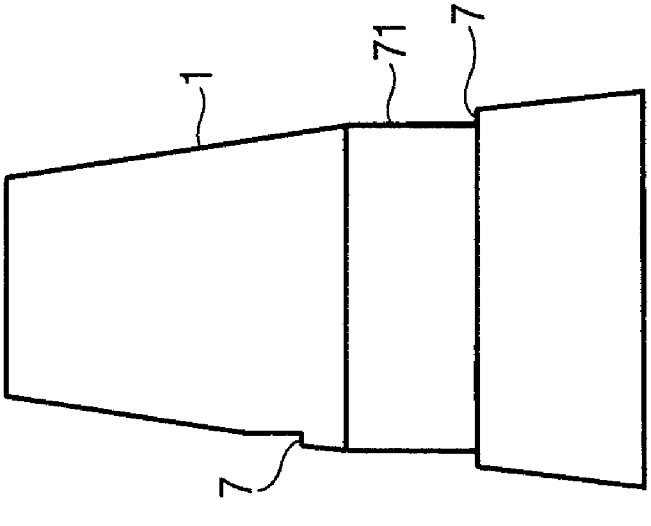
Figure 3A:
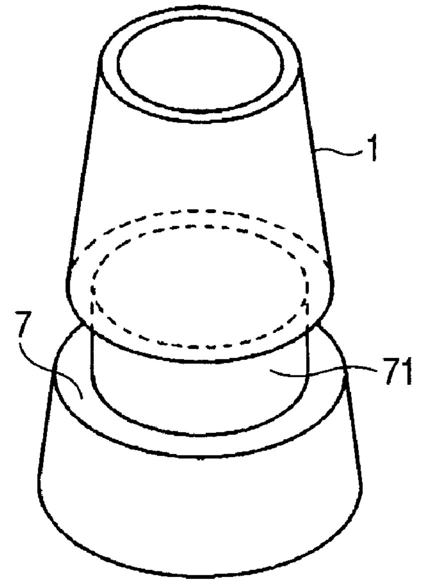
Figure 3B:
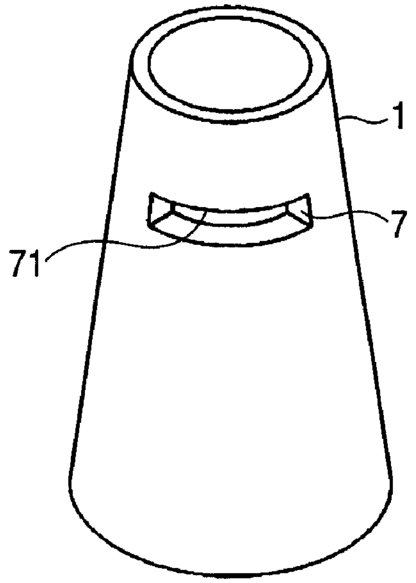
Figure 3C:
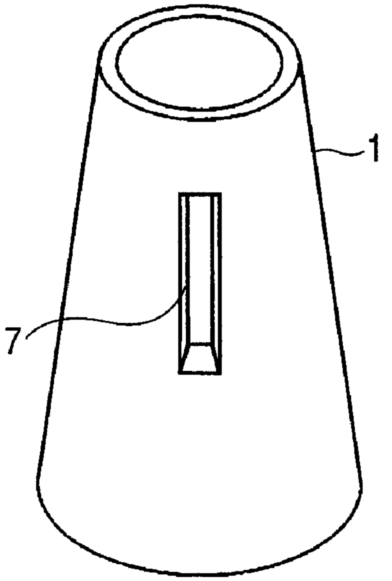
Figure 3D:
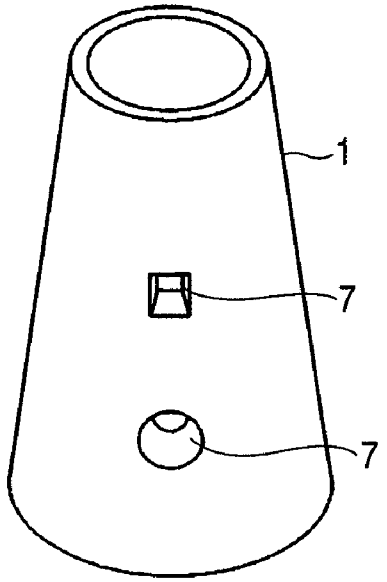

The concave portion 7 is not particularly restricted in a shape, a number and a position thereof, and may be provided in a shape, a number and a position as desired. Specific examples include a structure having an L-shaped vertical cross section as illustrated in FIG. 2A, and a structure having a square U-shaped vertical cross section as illustrated in FIG. 2B. It may also be formed over a circumference of the ferrule 1 as illustrated in FIG. 3A, or in a part of the circumference of the ferrule 1 as illustrated in FIG. 3B, or in an elongated form along the longitudinal direction of the ferrule 1 as illustrated in FIG. 3C, or in a square or circular shape as illustrated in FIG. 3D. Furthermore, these structures may be constructed in a suitable combination. In particular, a construction formed over the circumference of the ferrule 1 is satisfactory in appearance and is preferable. Also the bottom face 71 of the concave portion 7, namely a face opposed to the brilliant three-dimensional decoration member 6, is preferably formed linearly when seen from a side, since the brilliant three-dimensional decoration member 6 can be easily fixed and stably fixed.

With an excessively narrow width of the concave portion 7 in the shorter side direction, the brilliant three-dimensional decoration member 6 is difficult to fix, while an excessively large width is undesirable as an external article may be caught in an adjoining portion between the ferrule 1 and the brilliant three-dimensional decoration member 6. Therefore, a width W of the concave portion 7 in the shorter side direction thereof is preferably selected within a range of from 2 to 5 mm.

As the ferrule 1 normally has a thickness of from 2.5 to 3 mm, an excessively deep formation of the concave portion 7, having a thickness N of 0.5 mm or less corresponding to the concave portion N, is undesirable since such thin portion may be cracked when the shaft 2 is inserted from a leading end thereof. Therefore a depth D of the concave portion 7 is preferably within a range of from 0.2 to 2 mm.

Also a relation between the depth D of the concave portion 7 and the height of the brilliant three-dimensional decoration member 6 is not particularly restricted, but, when the depth D of the concave portion 7 is excessively larger in comparison with the height of the brilliant three-dimensional decoration member 6, it becomes difficult to fix the brilliant three-dimensional decoration member 6, and, when the depth is small, the brilliant three-dimensional decoration member 6 is liable to be hit by an external article and to be peeled off. Therefore, the depth may be such that the brilliant three-dimensional decoration member 6 protrudes slightly as illustrated in FIG. 4B, but is preferably so made, as illustrated in FIG. 4C, that the brilliant three-dimensional decoration member 6 is completely embedded in the concave portion 7.

Figure 5:
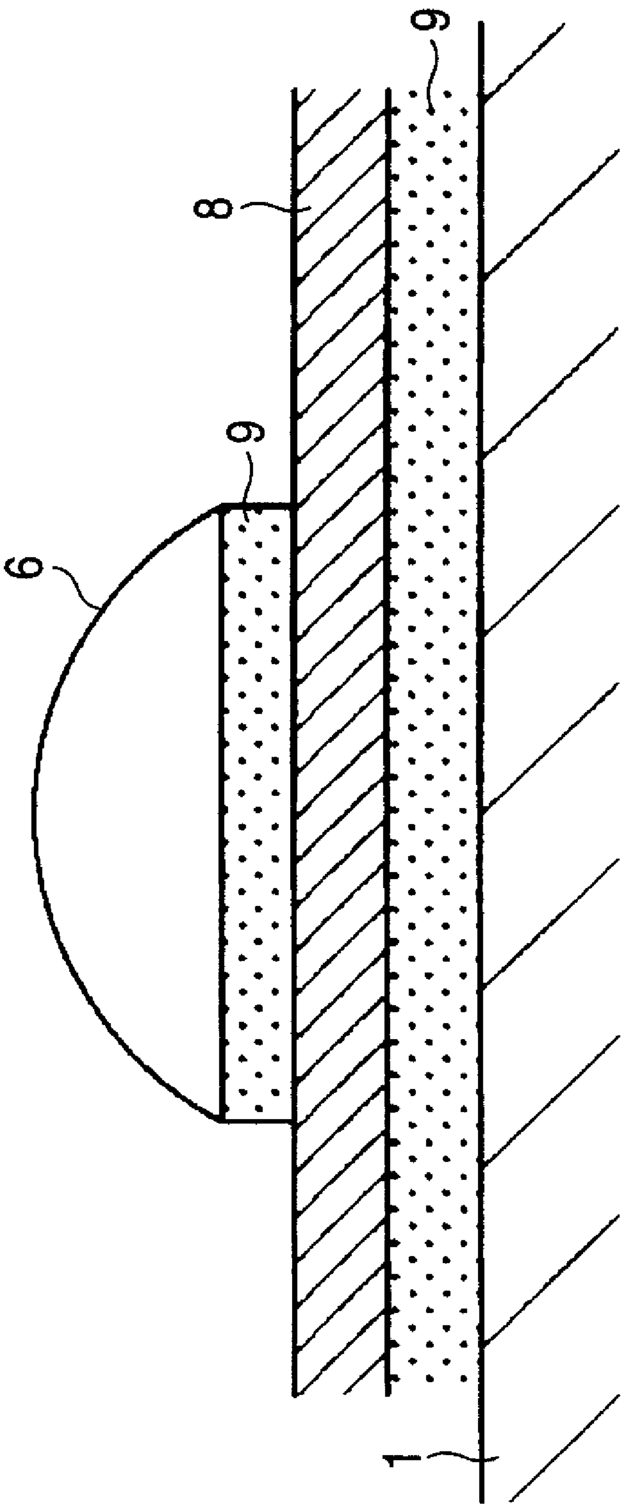
FIG. 5 is a partial cross-sectional view of another embodiment of the present invention.
Figure 6:
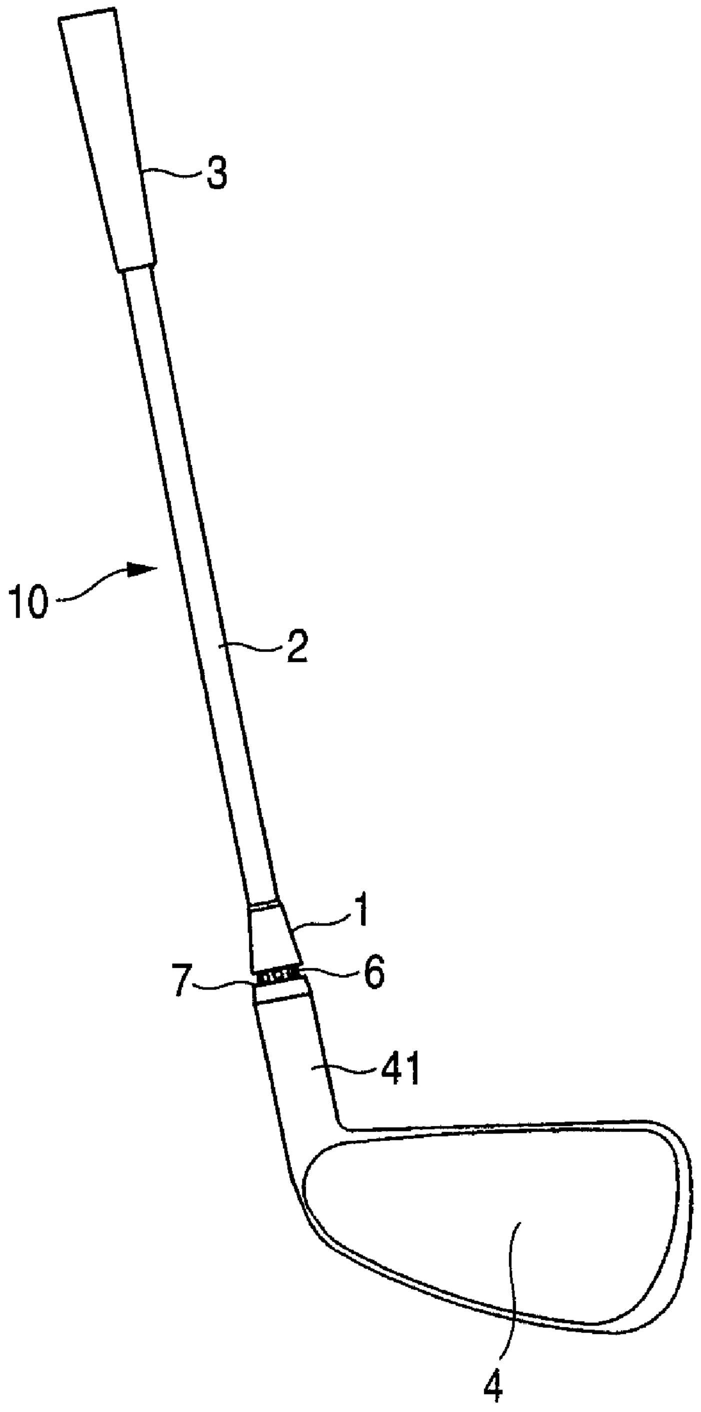
FIG. 6 is a lateral view of an embodiment of a golf club of the present invention.

The adhesion of the brilliant three-dimensional decoration member 6 onto the ferrule 1 may be achieved for example by a method of applying an adhesive material onto the ferrule 1 to form an adhesion layer 9 and pressing the brilliant three-dimensional decoration member 6 onto the adhesion layer 9, also a method of providing the adhesive material in advance on the rear surface of the brilliant three-dimensional decoration member 6 and executing adhesion by fusing the adhesive material by an ultrasonic vibration or by heating, or, in the case that the brilliant three-dimensional decoration member 6 is formed by a resin, a method of executing fused adhesion by an ultrasonic vibration or by heating, without using the adhesive material. Also employable is a flexible sheet 8 constructed, as illustrated in FIG. 5, in such a form as to be accommodated in the concave portion 7. The flexible sheet 8 is constructed by fixing the brilliant three-dimensional decoration member 6 on one surface by the method as described above and forming an adhesion layer 9 on the other surface, and such flexible sheet 8 is adhered to the ferrule 1. In this case, a serial pattern such as a flower-shaped pattern or a continuous pattern may be formed in advance with plural brilliant three-dimensional decoration members 6, the preparation of the decoration member can be simplified and facilitated.

Figure 4A:
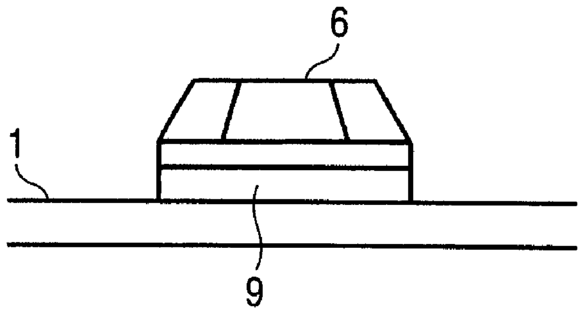
Figure 4B:
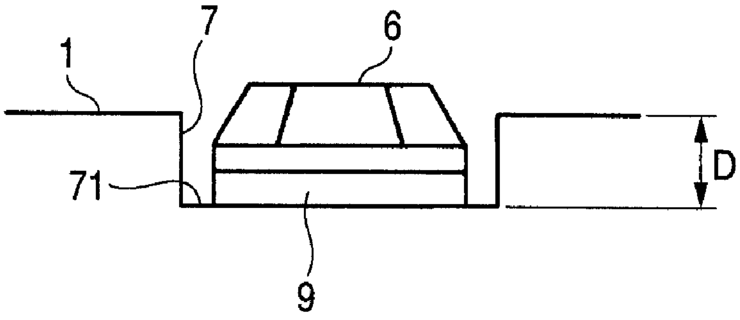
Figure 4C:
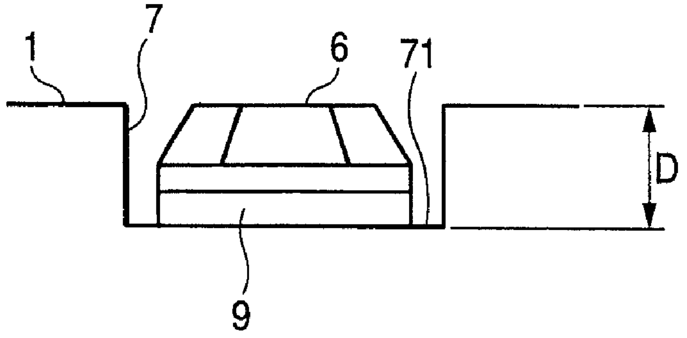

Further, as illustrated in FIG. 4A, the brilliant three-dimensional decoration member 6 may be directly fixed onto the ferrule 1 without forming the concave portion on the surface thereof.

According to one example of the invention, a ferrule of the invention is executed on an iron golf club. At first, a ferrule 1 is prepared by cutting celluloid. The ferrule 1 has a size of a height of 25 mm, an upper external diameter of 11 mm, an upper internal diameter of 9.15 mm, a lower external diameter of 13.8 mm and a lower internal diameter of 8.9 mm. A front end of a shaft 2 has a diameter of 9.0 mm including a coating. In an end portion of the shaft 2 to be accommodated in the hosel 41, the coating is scraped off by a sandpaper.

The ferrule 1, at the lower end thereof, is cut upwards from the external periphery toward the internal periphery, so as not to generate a gap when contacted with the hosel. Also in the internal peripheral portion, a downwardly annular protrusion (thickness: 0.7 mm, height: 1 mm) is provided. The protruding portion, being smaller than the internal diameter of the upper end of the ferrule 1 and having a small thickness, has such a structure coming in close contact with the shaft 2 and not easily displaced. The concave portion 7 of the ferrule 1 is formed from a position of 3 mm from the lower end, with a width of 5 mm, and a depth of 1 mm at the lower end side and 0.5 mm at the upper end side.

Then the ferrule 1 is penetrated by the front end of the shaft 2 by an appropriate amount (28 mm), and, with an adhesive material, the front end of the shaft 2 is inserted and fixed in the hosel 41. After the shaft 2 and the head 4 are completely adhered and fixed, an adhesive material is coated on the concave portion 7, and a granular article, formed by a slightly pale blue-colored transparent acryl resin with multiple facets as in a diamond cut and having longitudinal and lateral widths of about 2.5 mm, is fixed, in six units, in the concave portion 7 of the ferrule 1.

As a result, obtained is a golf club, having a highly decoration effect, being producible easily and inexpensively, also attracting attention of people by a glitteringly brilliant appearance and giving an enjoyment in use, without losing the strength of the ferrule and without losing the effect of the ferrule.

What is claimed is:

1. A ferrule comprising:

a plurality of brilliant three-dimensional decoration members fixed to a surface of the ferrule separately from each other; and a concave portion formed on a part of the surface of the ferrule, wherein the plurality of brilliant three-dimensional decoration members are completely embedded in the concave portion such that the plurality of brilliant three-dimensional decoration members and a portion of the concave portion forms an exposed surface on the ferrule.

2. The ferrule according to claim 1, wherein the concave portion is formed over a circumference of the ferrule.

3. The ferrule according to claim 1, wherein the concave portion has a width of from 2 to 5 mm in a shorter side direction and has a depth of from 0.2 to 2 mm.

4. The ferrule according to claim 1, wherein the plurality of brilliant three-dimensional decoration members have a width of from 0.5 to 3 mm.

5. The ferrule according to claim 1, wherein the plurality of brilliant three-dimensional decoration members include at least one of a transparent resinous granular article and a metal granular article.

6. The ferrule according to claim 5, wherein the transparent resinous granular article is faintly colored.

7. The ferrule according to claim 5, wherein a resin constituting the transparent resinous granular article is an acryl resin.

8. A golf club comprising:

a ferrule including a plurality of brilliant three-dimensional decoration members fixed to a surface of the ferrule separately from each other; and a concave portion formed on a part of the surface of the ferrule, wherein the plurality of brilliant three-dimensional decoration members are completely embedded in the concave portion such that the plurality of brilliant three-dimensional decoration members and a portion of the concave portion forms an exposed surface on the ferrule.

9. The ferrule according to claim 1, wherein the plurality of brilliant three-dimensional decoration members include a metal adhered on a rear surface.

* * * * *